United States Patent [19]

Hund et al.

[11] 4,084,984

[45] Apr. 18, 1978

[54] TEMPERATURE-STABLE INORGANIC YELLOW PIGMENTS

[75] Inventors: Franz Hund, Krefeld-Bockum; Wilhelm Holznagel; Henning Erfürth, both of Krefeld; Friedrich Kindervater, Leverkusen; Willi Hennings, Krefeld, all of Germany

[73] Assignee: Bayer Aktiengesellschaft, Leverkusen, Germany

[21] Appl. No.: 497,366

[22] Filed: Aug. 14, 1974

[30] Foreign Application Priority Data

Aug. 30, 1973 Germany .............................. 2343704

[51] Int. Cl.$^2$ ................................................ C09C 1/36
[52] U.S. Cl. .................................... 106/300; 106/304; 106/306
[58] Field of Search ................ 106/304, 300; 423/598, 423/594

[56] References Cited

U.S. PATENT DOCUMENTS 3,214,283  10/1965  Chopoorian .................... 106/304

Primary Examiner—Winston A. Douglas
Assistant Examiner—J. V. Howard
Attorney, Agent, or Firm—Burgess, Dinklage & Sprung

[57] ABSTRACT

A temperature-stable inorganic yellow pigment of the composition $Fe_2TiO_5 \cdot x\ TiO_2$, where $x$ is from 0 to about 15, with a particle diameter of less than about 1 micron is produced by forming an aqueous suspension of at least one finely divided iron compound selected from the group consisting of iron oxide, iron oxide hydroxide, iron hydroxide and iron carbonate and at least one finely divided titanium compound selected from the group consisting of titanium dioxide and titanium dioxide oxide hydrate, the iron and titanium compounds being present in accordance with the stoichiometric composition $Fe_2TiO_5 \cdot x\ TiO_2$ where $x$ is from 0 to about 15, removing the aqueous phase from the mixed suspension, and calcining the residue at a temperature from about 600° C to 1100° C.

6 Claims, No Drawings

TEMPERATURE-STABLE INORGANIC YELLOW PIGMENTS

Chromates (VI) of calcium, strontium, barium, lead and zinc, litharge (PbO), Naples yellow (lead antimonate), cadmium yellow, iron oxide yellow and the rutile mixed phases of $TiO_2$ with nickel-antimony or chromium-antimony oxides are used as inorganic yellow pigments. Of these inorganic yellow pigments, the iron oxide yellows ($\alpha$- and $\gamma$-FeOOH) are only temperature-stable up to about 220° C. The yellow pigments containing chromate (VI) and Pb cannot always be used either. The fine, temperature-resistant yellow cadmium sulfide and rutile mixed phase pigments are generally too expensive for mass colouring purposes. Organic yellow pigments are thermally and optically too unstable for the above-mentioned applications and are also expensive. Accordingly, there is a considerable demand for heat- and light-stable, relatively inexpensive inorganic yellow pigments of high tinting strength which can be used, for example, for coloring yellow, yellowish-brown to yellowish-orange, organic plastics processed under heat at temperatures above 200° C (polyvinyl chloride, polyethylene, polystyrene and others), or inorganic glazes for enamel and ceramics, ceramic masses or concrete roof-tile granulates heated to temperatures above 500° C.

It is accordingly an object of the present invention to provide stable yellow pigments.

This and other objects and advantages are realized in accordance with the present invention pursuant to which there is provided a temperature-stable inorganic yellow pigment of the composition $Fe_2TiO_5 \cdot x\ TiO_2$, where $x$ is from 0 to about 15, with a particle diameter of less than about 1 micron. The invention also provides a process for producing such a pigment comprising forming an aqueous suspension of at least one finely divided iron compound selected from the group consisting of iron oxide, iron oxide hydroxide iron hydroxide and iron carbonate and at least one finely divided titanium compound selected from the group consisting of titanium dioxide and titanium dioxide oxide hydrate, the iron and titanium compounds being present in accordance with the stoichiometric composition $Fe_2TiO_5 \cdot x\ TiO_2$ where $x$ is from 0 to about 15, removing the aqueous phase from the mixed suspension, and calcining the residue at a temperature from about 600° C to 1100° C.

The pigments according to the invention are heatstable, relatively inexpensive, yellow, yellowish-brown to yellowish-orange colored, inorganic pigments of high tinting strength which consist of $Fe_2TiO_5$ crystallizing in the pseudobrookite lattice or of mixtures of $Fe_2TiO_5$ crystallizing in the pseudobrookite lattice with $TiO_2$ of rutile or anatase structure. The excess $TiO_2$ in relation to pure $Fe_2TiO_5$ is probably present either in chemical solution in the $Fe_2TiO_5$ crystallizing in the pseubobrookite lattice, with heterotype mixed-phase formation, or in the form of $TiO_2$ crystallizing in the anatase or rutile lattice.

$Fe_2TiO_5$, pseudobrookite, crystallizes orthorhombically with $a_o = 9.79$; $b_o = 9.93$ and $c_o = 3.72$ A and four molecules of the compound in the elemental cell and is the thermodynamically stable modification from room temperature up to about 1200° C (C.R.Ser. C. 263, 1223, 1966). It has an average refractive index of about 2.40. It is known that $Fe_2TiO_5$ crystallizing in the pseudobrookite lattice can be obtained by heating compounds of trivalent iron and tetravalent titanium to temperatures of 1400° C. The high production temperature, or rather the sintering which it promotes, gives rise to the formation of very coarse solid particles having a particle diameter which exceeds the optimum particle diameter for pigments (0.1 to 1 micron), and which therefore have a dark, dirty brown color coupled with low tinting strength. However, the temperature-stable inorganic yellow to yellowish-brown pigments according to the present invention based on $Fe_2TiO_5$ crystallizing in the pseudobrookite lattice are obtained by virtue of the fact that, by using suitable reactive iron and titanium compounds in suitable relative quantitative ratios at such a low calcination temperature, optionally even by using a weakly reducing calcination atmosphere such as $SO_2$ or CO for the first quarter of the overall calcination time, the components are completely reacted to form the compound $Fe_2TiO_5$ or its solid solution with $TiO_2$, in which the particle diameter of the pigments remains below 1.0 micron. Suitable reactive iron compounds include iron (II) oxide, iron (II) hydroxide, iron (II) carbonate, iron (III) oxide hydroxide and amorphous iron (III) hydroxide or $Fe_3O_4$ in finely divided form. Iron (II) hydroxide or carbonate, iron oxide hydroxide or amorphous iron hydroxide can be obtained for example in known manner from iron (II) salt solutions, preferably from iron sulfate solutions with alkali metal, ammonium or alkaline earth metal hydroxide or carbonate. $Fe_3O_4$ can be used with advantage in the form in which it accumulates after nitrobenzene reduction with iron in concentrated $FeCl_2$-solution, i.e. in the form of a finely divided black sludge (German Pat. No. 463,773).

One particularly suitable reactive, finely divided titanium dioxide is the uncalcined, washed titanium dioxide aquate sludge which accumulates during the hydrolysis of titanium (IV) salts on an industrial scale, preferably during the hydrolysis of titanium sulfate. The low sulfate content of the washed white sludge is of particular advantage for establishing the weakly reducing calcination atmosphere in the first quarter of the overall calcination time. Chloride hydrolysis sludge, like an iron (II) hydroxide or carbonate precipitated from iron (II) chloride solution, can be improved in regard to its suitability as a starting material by the absorption of sulfate ions or by the addition of elemental sulfur or carbon. Reducing agents, such as finely divided carbon or sulfur, can be used in quantities of about 0.1 to 10% by weight, preferably in quantities of about 0.2 to 5% by weight (based on the end pigment). Under the same calcination conditions, the particle diameters of the pigments obtained are finer, the more finely divided the starting materials used. Preferably the particle sizes of the starting iron and titanium compounds is less than about 0.50 micron and especially less than about 0.30 micron. They can be present as fine sludges. Such fine sizes necessarily result in a large surface area, e.g. more than about 2 m²/g and preferably more than about 3 m²/g. The yellow, yellowish-orange or yellowish-brown colour attributable to the particle size of the calcined pigment can be influenced not only by the particle size of the starting materials, but also by their relative quantitative ratios, i.e. by the value of $x$ in the general formula $Fe_2TiO_5 \cdot x\ TiO_2$, where $x$ is from 0 to 15, preferably from 0.5 to 10 and, with particular preference, from 1 to 5. With a given starting material and calcination conditions, the color and tinting strength of the pigment may be changed from yellowish-brown through yellowish-orange and yellow to a pale yellow by increasing $x$, values of about 1 to 5 for $x$ are of particular interest for a number of applications. Where $x$ has a value about 2 to 3, heatstable inorganic yellow pigments are obtained which, although substantially equivalent in terms of tinting strength to the thermally unstable iron oxide hydroxide yellow pigments crystallizing in the goethite lattice, have a distinctly purer color.

In a first embodiment of the process according to the invention, a finely divided $Fe_3O_4$-black sludge and a $TiO_2$-white sludge are mixed in accordance with the general formula $Fe_2TiO_5 \cdot x\ TiO_2$, the resulting mixed suspension is washed and/or concentrated by evaporation or spray-dried or filtered and dried, or only filtered, and the filter cake or dry material is calcined at temperatures above 600° C, preferably at temperatures of from 750 to 1000° C, to form pigments of suitable particle size and with the required composition.

In a second embodiment, a $TiO_2$-suspension is mixed with iron (II) salt solution and the mixture is adjusted with alkali metal, ammonium or alkaline earth metal hydroxide or carbonate to pH-values in the range of about 5 to 12, preferably about 7 to 10. The resulting mixed precipitates can then be further treated in the same way as already described with reference to the first embodiment.

The color of the pigments produced in accordance with the invention can be further influenced by the selection of the calcination temperature and duration of calcination. With increasing calcination temperature of time of calcination, but under otherwise the same conditions, the color changes from a pale yellow through a pure, orangy yellow to a brownish yellow corresponding to the resulting growth of the pigment particles. The calcination time is from about 0.1 to 10 hours, preferably from 0.5 to 5 hours.

The process according to the invention is illustrated in the following Examples.

EXAMPLE 1

In accordance with the data in Table 1, $a$ g of a washed $Fe_3O_4$ black sludge, of the kind which accumulates during nitrobenzene reduction with iron in concentrated $FeCl_2$-solution on an industrial scale, with an $Fe_3O_4$-content (calculated from total iron) corresponding to $b\%$ of $Fe_2O_3$, were mixed with intensive stirring with $c$ g of washed $TiO_2$-white sludge resulting from the hydrolysis of titanium sulfate on a industrial scale with a $TiO_2$-content of $d\%$. The mixture was either filtered under suction, concentrated by evaporation or spray-dried, and the filter cake or the dry product was calcined in parallel current for the time indicated at the temperature indicated either in an open, covered crucible, covered for the first quarter of the overall calcination time and then opened, or in a rotary tubular kiln. The pigment obtained after grinding, with the composition $Fe_2TiO_5 \cdot x\ TiO_2$, varies from $0 \leq x \leq 10$ according to the data of Table 1. A reducing agent, for example sulfur or finely divided carbon (carbon black), can be added to the mixture of sludges in quantities of from 0.2 to 5.0%, based on the end pigment, so that under otherwise the same conditions the color of the pigments can be made more yellow through the reducing effect of the gas atmosphere during the first part of the calcination process. The color of the pigment changes from yellowish-brown to brownish-yellow, orangy yellow, yellow and pale yellow with increasing value of $x$.

EXAMPLE 2

In accordance with Table 2, $a$ ml of an iron (II) sulfate solution containing $b$ g of $FeSO_4$ per liter were mixed while stirring with $c$ g of washed $TiO_2$-sludge resulting from the hydrolysis of titanium sulfate on an industrial scale with a $TiO_2$ content of $d\%$. 2 to 4 molar NaOH or $Na_2CO_3$-solution was then added to the suspension up to or slightly above neutral point, so that the iron (II) ion was precipitated in the form of iron (II) hydroxide or carbonate. The mixed suspension was washed, suction filtered or spray-dried. The filter cake or the dry product was then calcined in parallel current or counter current for the period indicated at the temperature indicated either in an open, covered crucible, covered for the first quarter of calcination and then opened, or in a tubular rotary kiln. The pigment obtained after grinding, with the composition $Fe_2TiO_5 \cdot x\ TiO_2$, varies from $0 \leq x \leq 4$. The color of the pigments changed from yellowish brown through brownish yellow, orangy yellow to pure yellow with increasing content of $x\ TiO_2$ (unless otherwise indicated, percentage contents are expressed in per cent by weight).

Table 1

Production conditions and color of pigments according to Example 1

| Example No. | $x$ in $Fe_2TiO_5 \cdot x\ TiO_2$ | $a$ in g of $Fe_3O_4$-sludge | $k$ in % of $Fe_2O_3$, calculated from total iron | $c$ in g of $TiO_2$-sludge | $d$ in % of $TiO_2$ | Calcination time and temperature in °C | Color of the Pigment |
|---|---|---|---|---|---|---|---|
| 1.1 | 0.0 | 94.22 | 33.90 | 81.95 | 19.50 | 2 h. at 900° | yellow-brown |
| 1.2 | 0.5 | 80.87 | 39.50 | 98.88 | 24.24 | 1 h. at 900° | brownish-yellow |
| 1.3 | 1.0 | 94.22 | 33.90 | 163.90 | 19.50 | 2 hr. at 900° | yellow-orange |
| 1.4 | 2.0 | 94.22 | 33.90 | 245.85 | 19.50 | 2 h. at 900° | yellow tinged with orange |
| 1.5 | 3.0 | 94.22 | 33.90 | 327.78 | 19.50 | 2 h. at 1000° | yellow |
| 1.6 | 3.0 + 2 % S | 98.57 | 32.40 | 280.20 | 22.81 | 1 h. at 800° | dirty yellow |
| 1.7 | 3.0 + 1% carbon black | 88.63 | 36.04 | 248.14 | 25.76 | 1 h. at 800° | dirty yellow |
| 1.8 | 4.0 | 78.67 | 40.60 | 327.43 | 24.40 | 1 h. at 900° | dirty yellow |
| 1.9 | 10.0 | 80.87 | 39.50 | 684.80 | 25.67 | 15 Mins at 900° 45 Mins at 700° | pale, light yellow |

Table 2

Production conditions and color of pigments according to Example 2

| Example No. | x in Fe$_2$TiO$_5$ · x TiO$_2$ | a in ml of FeSO$_4$ solution | b in g/l of FeSO$_4$ | c in g of TiO$_2$ sludge | d in % of TiO$_2$ | Calcination Temperature °C (time 1 hr) | Color of the pigment |
|---|---|---|---|---|---|---|---|
| 2.1 | 0.0 | 688.7 | 22.06 | 154.70 | 25.83 | 800 | yellowish brown |
| 2.2 | 1.0 | 545.2 | 22.30 | 249.00 | 25.67 | 900 | yellow-brown |
| 2.3 | 2.0 | 272.6 | 22.30 | 186.80 | 25.67 | 900 | brown-yellow |
| 2.4 | 3.0 | 255.3 | 23.80 | 263.67 | 24.24 | 880 | yellow |
| 2.5 | 3.0 | 545.2 | 22.30 | 496.30 | 25.76 | 800 | yellow tinged with brown |
| 2.6 | 4.0 | 272.6 | 22.30 | 311.30 | 25.67 | 900 | pale yellow |

The pigments so produced can be incorporated to the extent of about 0.5 to 5% or more by weight into molten plastics such as cellulose acetate which is used for making shaped objects. It can also be mixed in similar amounts into other organic plastics, inorganic glazes for enamels and ceramics, ceramic masses or concrete roof-tile granulates.

It will be appreciated that the instant specification and examples are set forth by way of illustration and not limitation, and that various modifications and changes may be made without departing from the spirit and scope of the present invention.

What is claimed is:

1. A temperature-stable inorganic yellow pigment of the composition Fe$_2$TiO$_5$ · x TiO$_2$, where x is from about 0.5 to about 10, with a particle diameter of less than about 1 micron.

2. A temperature-stable inorganic yellow pigment according to claim 1, wherein x is from about 1.0 to 5.

3. A process for the production of a temperature stable inorganic yellow pigment, comprising adding to a solution of an iron (II) salt at least one alkali metal, ammonium or alkaline earth metal hydroxide or carbonate to precipitate at least one finely divided iron compound having a specific surface greater than 3 m$^2$/g and selected from the group consisting of iron oxide, iron oxide hydroxide, iron hydroxide and iron carbonate, forming a sludge of said finely divided iron compound, adding to said sludge a titanium dioxide white sludge resulting from the hydrolysis of a titanium (IV) salt, thereby to form an aqueous suspension, the iron compound and titanium dioxide being present in accordance with the stoichiometric composition Fe$_2$TiO$_5$ · x TiO$_2$ where x is from about 0.5 to about 10, removing the aqueous phase from the mixed suspension, and calcining the residue at a temperature from about 600° C to 1100° C, the first quarter calcination being carried out in a weakly reducing atmosphere whereby the pigment particles are less than about 1 micron.

4. A process according to claim 3, wherein a reducing agent is added to the mixed suspension in about 0.1 to 10% by weight, based on the end pigment, 5. A temperature-stable yellow pigment according to claim 1 present as the coloring agent in an organic plastic, inorganic glaze of an enamel or ceramic, ceramic mass or concrete roof-tile granulate.

6. A pigment according to claim 5 present as the coloring agent in an inorganic glaze of an enamel or ceramic, ceramic mass or concrete roof-tile granulate.

* * * * *